United States Patent

Suzuki et al.

[11] Patent Number: 5,849,254
[45] Date of Patent: Dec. 15, 1998

[54] METHOD FOR PURIFYING EXHAUST GASES WITH TWO LAYER CATALYST IN OXYGEN-RICH ATMOSPHERE

[75] Inventors: Hiromasa Suzuki, Kasugai; Naoto Miyoshi, Nagoya, both of Japan

[73] Assignee: Toyota Jidosha Kabushiki Kaisha, Toyota, Japan

[21] Appl. No.: 625,922

[22] Filed: Apr. 1, 1996

Related U.S. Application Data

[63] Continuation of Ser. No. 366,506, Dec. 30, 1994, abandoned.

[30] Foreign Application Priority Data

Jan. 20, 1994 [JP] Japan ................................ 6-004436

[51] Int. Cl.[6] ............................ B01D 53/60; C01K 1/34
[52] U.S. Cl. .................................. 423/213.5; 423/239.1; 502/328; 502/330; 422/177
[58] Field of Search ............................ 423/213.5, 239.1; 502/328, 330; 422/177

[56] References Cited

U.S. PATENT DOCUMENTS

| | | | |
|---|---|---|---|
| 3,045,422 | 7/1962 | Houdry et al. | 422/177 |
| 3,978,193 | 8/1976 | Fedor et al. | 422/171 |
| 4,003,976 | 1/1977 | Komatsu et al. | 423/214.5 |
| 4,091,072 | 5/1978 | McArthur | 423/213.5 |
| 4,153,579 | 5/1979 | Summers et al. | 423/213.5 |
| 4,350,613 | 9/1982 | Nishino et al. | 252/455 R |
| 4,369,132 | 1/1983 | Kinoshita et al. | 502/261 |
| 4,678,770 | 7/1987 | Wan et al. | 423/213.5 |
| 4,931,419 | 6/1990 | Blanchard et al. | 502/304 |
| 5,116,800 | 5/1992 | Williamson et al. | 502/303 |
| 5,388,406 | 2/1995 | Takeshima et al. | 60/297 |

FOREIGN PATENT DOCUMENTS

| | | |
|---|---|---|
| 0 393 517 A3 | 10/1990 | European Pat. Off. . |
| 0 573 672 A1 | 12/1993 | European Pat. Off. . |
| 40 08 371 A1 | 9/1990 | Germany . |
| 60 200 021 | 10/1985 | Japan . |
| 5 317 652 | 12/1993 | Japan . |

Primary Examiner—Glenn Caldarola
Assistant Examiner—Nadine Preisch
Attorney, Agent, or Firm—Oliff & Berridge, P.L.C.

[57] ABSTRACT

A catalyst for purifying exhaust gases which aims to efficiently purify $NO_x$ in exhaust gases in oxygen-rich atmospheres whose oxygen concentrations are more than required for oxidizing CO and HC, and to attain improved $NO_x$ purifying performance after used for a long time. The catalyst comprises, being arranged in an order from the upstream to the downstream of exhaust gas flow, a first catalyst 1 in which a noble metal catalyst 12 is loaded on a porous acidic support, a second catalyst 2 in which at least one kind of metal 22 selected from the group consisting of alkali metals, alkaline-earth metals, and rare earth metals is loaded on a porous support, and a third catalyst 3 in which a noble metal catalyst 32 is loaded on a porous support. Since $SO_2$ is not adsorbed or oxidized by the first catalyst 1, $SO_2$ is discharged downstream from the second catalyst 2 without generating sulfate. Therefore, since the $NO_x$ absorber is free from degradation even after used for a long time, the second catalyst 2 maintains high $NO_x$ adsorbing performance on the fuel-lean side, and the third catalyst 3 reduces $NO_x$ which are emitted from the second catalyst 2 on the stoichiometric point or on the fuel-rich side.

4 Claims, 1 Drawing Sheet

5,849,254

METHOD FOR PURIFYING EXHAUST GASES WITH TWO LAYER CATALYST IN OXYGEN-RICH ATMOSPHERE

This is a continuation of application Ser. No. 08/366,506 filed Dec. 30, 1994 now abandoned.

BACKGROUND OF THE INVENTION

1. Field of the Invention

The present invention relates to a catalyst for purifying exhaust gases from automobiles, and more particularly, to a catalyst which can efficiently purify nitrogen oxides ($NO_x$) in exhaust gases in oxygen-rich atmospheres whose oxygen concentrations are more than required for oxidizing carbon monoxide (CO) and hydrocarbons (HC) therein.

2. Description of the Related Art

As catalysts for purifying automotive exhaust gases, there have been employed 3-way catalysts so far which oxidize CO and HC and reduce $NO_x$ simultaneously into innocuous entities. For example, 3-way catalysts have been known widely which comprise a heat resistant support formed of cordierite, a catalyst carrier layer formed of gamma-alumina and disposed on the support, and a noble metal catalyst selected from the group consisting of Pt, Pd, and Rh and loaded on the catalyst carrier layer.

The purifying performance of these 3-way catalysts for purifying exhaust gases largely depends on the air-fuel ratio (A/F) of automotive engines. For instance, when the air-fuel ratio is large, i.e., when the fuel concentration is small (or on the fuel-lean side), the oxygen concentration is large in exhaust gases. Accordingly, the reactions of oxidizing CO and HC are active, but the reactions of reducing $NO_x$ are inactive. On the other hand, when the air-fuel ratio is small, i.e., when the fuel concentration is high (or on the fuel-rich side), the oxygen concentration is small in exhaust gases. Accordingly, the oxidation reactions are inactive, but the reduction reactions are active.

Moreover, when driving automobiles, especially when driving automobiles in urban areas, the automobiles are accelerated and decelerated frequently. Accordingly, the air-fuel ratio varies frequently in a range from the values adjacent to the stoichiometric point (or the ideal air-fuel ratio) to the fuel-rich side. In order to satisfy the low fuel consumption requirement during the driving in urban areas, it is necessary to operate automobiles on the fuel-lean side where the air-fuel mixture containing as excessive oxygen as possible is supplied to the engines. Hence, it has been desired to develop a catalyst which is capable of adequately purifying $NO_x$ on the fuel-lean side (i.e., in the oxygen-rich atmospheres).

In view of the aforementioned circumstances, the applicants of the present invention applied for a Japanese Patent for a novel catalyst under Japanese Unexamined Patent Publication (KOKAI) No.5-317,652. This catalyst comprises a support, and an alkaline-earth metal and Pt loaded on the support. With this support, $NO_x$ are adsorbed on the alkaline-earth metal when the air-fuel ratios are on the fuel-lean side (i.e., in the oxygen-rich atmospheres) driving. Then, when the automobiles are driven under the air-fuel ratios at the stoichiometric point or on the fuel-rich side (i.e., in the oxygen-lean atmospheres), $NO_x$ are purified by reacting with reducing gases such as HC and the like. Thus, this catalyst is superb in the $NO_x$ purifying performance even on the fuel-lean side (i.e., in the oxygen-rich atmospheres).

This catalyst is believed to adsorb $NO_x$ by the following mechanism: The alkaline-earth metal, for example, Ba is loaded on the support in a form of the simple oxide. The simple oxide of Ba reacts with $NO_x$ to produce barium nitrate ($Ba(NO_3)_2$). Thus, $NO_x$ are adsorbed on the support of the catalyst.

However, the exhaust gases usually contain $SO_2$ which is produced by burning sulfur (S) contained in the fuel. The catalyst ingredient further oxidizes $SO_2$ to $SO_3$ in the oxygen-rich atmospheres (i.e., on the fuel-lean side). Then it has become apparent that $SO_3$ reacts readily with water also contained in the exhaust gases to produce sulfuric acid, and that the resulting sulfuric acid reacts with Ba to produce sulfite and/or sulfate, which do not adsorb $NO_x$. When Ba or the like is converted into sulfite or sulfate, it cannot adsorb $NO_x$ any more. As a result, this catalyst suffers from a drawback in that it is deteriorated in terms of the $NO_x$ purifying performance after it has been used for a long time.

SUMMARY OF THE INVENTION

The present invention has been developed in view of the aforementioned circumstances. It is therefore an object of the present invention to provide a catalyst which can efficiently purify nitrogen oxides ($NO_x$) in exhaust gases in oxygen-rich atmospheres whose oxygen concentrations are more than required for oxidizing CO and HC. It is an another object of the present invention to provide a catalyst which attains improved $NO_x$ purifying performance after it has been used for a long time by preventing an $NO_x$ absorber from degraded due to its generation of salts of $SO_x$.

A catalyst for purifying exhaust gases according to a first aspect of the present invention comprises, being arranged in an order from the upstream to the downstream of exhaust gas flow, a first catalyst in which a noble metal catalyst is loaded on a porous acidic support, a second catalyst in which at least one kind of $NO_x$ absorber selected from the group consisting of alkali metals, alkaline-earth metals, and rare earth metals is loaded on a porous support, and a third catalyst in which a noble metal catalyst is loaded on a porous support.

A catalyst for purifying exhaust gases according to a second aspect of the present invention is a catalyst in which at least one kind of $NO_x$ absorber selected from the group consisting of alkali metals, alkaline-earth metals and rare earth metals, and a noble metal catalyst are loaded on a porous support, and the surface layer of the porous support includes oxides of at least one metal selected from the group consisting of iron (Fe), cobalt (Co), nickel (Ni), copper (Cu) and manganese (Mn).

In the catalyst for purifying exhaust gases according to the first aspect of the present invention, first, automotive exhaust gases contact the first catalyst. This first catalyst has a property of not adsorbing $SO_2$, because the support is acidic. Therefore, $SO_2$ is prevented from being adsorbed on the support and from being oxidized by the noble metal catalyst, and most $SO_2$ flows into the second catalyst as it is. When a metal such as nickel (Ni), iron (Fe), zinc (Zn), and vanadium (V) is loaded in addition to the noble metal catalyst, $SO_2$ is more securely prevented from oxidation. This is supposed to be because these metals serve to decrease the oxidation force of the noble metal catalyst.

The porous acidic support of the first catalyst is suitably formed from materials such as $SiO_2$, $ZrO_2$, $SiO_2$—$Al_2O_3$, $TiO_2$, and so on.

The exhaust gases flowing into the second catalyst contain almost no $SO_3$ for the reason described in the above. Therefore, at least one kind of $NO_x$ absorber selected from the group consisting of alkali metals, alkaline-earth metals, and rare earth metals is prevented from generating salts with $SO_3$, and can adsorb $NO_x$ in the exhaust gases efficiently. It has been apparent that $NO_2$ is better adsorbed by $NO_x$ absorbers than NO. NO in the exhaust gases in oxygen-rich atmospheres is efficiently oxidized by the first catalyst and flows into the second catalyst in the form of $NO_2$ and other $NO_x$. Therefore, the $NO_x$ absorber in the second catalyst efficiently adsorbs $NO_x$. In this way, the exhaust amounts of $NO_x$ in the fuel-lean atmosphere are decreased.

Then, the $NO_x$ adsorbed by the second catalyst is discharged when the air-fuel ratio is at the stoichiometric point or on the fuel-rich side, and flows into the third catalyst where the $NO_x$ is reduced into innocuous entity by 3-way activity.

Examples of the suitable porous supports of the second catalyst and the third catalyst include $Al_2O_3$, zeolite, $SiO_2$, $ZrO_2$, and $SiO_2$—$Al_2O_3$. $Al_2O_3$ is most preferable. The supports can be formed from these porous bodies in themselves, or formed by coating honeycombs made of cordierite, heat-resistant metals or the like with these porous bodies.

In the second catalyst, it is also preferable to load a transition metal in addition to at least one kind of $NO_x$ absorber selected from the group consisting of alkali metals, alkaline-earth metals, and rare earth metals. This transition metal may be loaded by adding not only as a simple substance but also as a composite oxide such as $BaCuO_2$, $LaCoO_3$, $LaBaCoO_3$. The loading of this transition metal allows the temperature window of $NO_x$ purifying performance to be transferred in the direction of higher temperatures.

For example, when Ba alone is loaded, the peak temperature of $NO_x$ purifying performance is 250° C., but when Ba and Cu are loaded, the peak temperature moves to 400° C., and when Ba and Co are loaded, the peak temperature moves to 450° C., and when Ba and Fe are loaded, the peak temperature moves to 400° C. Further, the loading of plural kinds of metals achieves an increase in the width of the temperature window. This offers an advantage of providing greater freedom in installing catalysts. It must be noted that transition metals exhibit lower oxidization catalyst performance than noble metal catalysts. Therefore, almost no $SO_3$ generates in the second catalyst, and at least one kind of $NO_x$ absorber selected from the group consisting of alkali metals, alkaline-earth metals, and rare earth metals is able to exhibit the function of adsorbing $NO_x$ to the maximum.

In the catalyst for purifying exhaust gases according to the second aspect of the present invention, the surface layer of the porous support includes oxides of at least one metal selected from the group consisting of Fe, Co, Ni, Cu and Mn. These metal oxides have the function of oxidizing $SO_2$ into $SO_3$ although this function is not strong, and the metal oxides take in $SO_3$ and $H_2SO_4$ which is formed by reacting $SO_3$ with water, and form salts of $SO_x$. Therefore, $SO_x$ do not reach the $NO_x$ absorber which exists inside of the support and accordingly the $NO_x$ absorber is prevented from generating salts of $SO_x$.

The above metal oxides generate salts of $SO_x$ and $NO_x$, respectively, but the salts of $NO_x$ decompose at about 300° C. and the salts of $SO_x$ decompose at about 500° C. Therefore, at the time of ordinary driving where the inlet automotive exhaust gas temperature to the bed of catalyst is approximately in a range from 300° to 400° C., the $NO_x$ which were taken in and formed into salts decompose soon and are taken in by the $NO_x$ absorber on the inside of the porous support. Further, the metal oxides which once decomposed and regenerated adsorb $SO_x$ and form salts of $SO_x$. On the other hand, at the time of ordinary driving, $SO_x$ exist in the form of salts, and accordingly, do not react with the $NO_x$ absorber. Therefore, the $NO_x$ absorber is prevented from being degraded due to its generation of salts of $SO_x$, and the salts of metal oxide and $SO_x$ decompose approximately above 500° C. and $SO_x$ are discharged downstream.

It is necessary that $SO_2$ and NO are oxidized into $SO_3$ and $NO_2$ respectively in order to react with the metal oxides and generate salts. In the second aspect of the invention, a noble metal catalyst, when loaded on the surface layer in addition to the metal oxides, promotes the oxidation of NO and the resulting $NO_2$ reacts with the metal oxides and generates salts. Accordingly, NO is prevented from being discharged downstream. In the meanwhile, the noble metal catalyst also promotes the oxidation of $SO_2$, and the taking in of the resulting $SO_x$ by the above metal oxides is given preference over other elements. As described in the above, $NO_2$ is quickly taken in by the $NO_x$ absorber and the taken-in $NO_x$ securely react with HC or CO when the fuel-air ratio is at the stoichiometric point. As a result, the $NO_x$ purifying performance even after used for a long time is improved.

The catalyst for purifying exhaust gases according to the present invention has the following advantages.

According to the present invention, at least one kind of loaded $NO_x$ absorber selected from the group consisting of alkali metals, alkaline-earth metals, and rare earth metals is prevented from contacting $SO_3$. Therefore, the $NO_x$ absorber is free from degradation caused by its generation of sulfite and/or sulfate. Therefore, the catalyst exhibits high $NO_x$ purifying performance even after it has been used for a long time and is superior in durability.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure.

THE PREFERRED EMBODIMENTS OF THE PRESENT INVENTION

Having generally described the present invention, a further understanding can be obtained by reference to the specific preferred embodiments which are provided herein for purposes of illustration only and are not intended to limit the scope of the appended claims.

The First Preferred Embodiment

Figure 1:
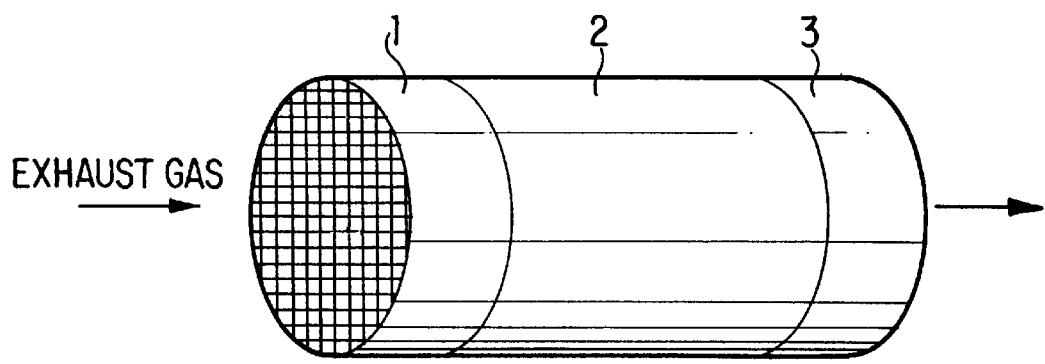
FIG. 1 is a perspective view of a catalyst for purifying exhaust gases according to a first preferred embodiment of the present invention.
Figure 2:
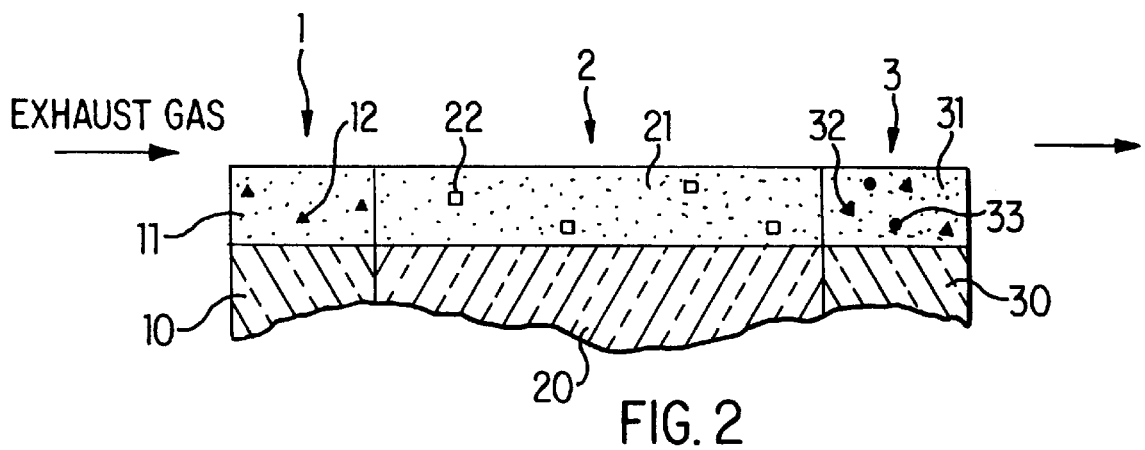
FIG. 2 is a cross-sectional view for explaining the constitution of the catalyst for purifying exhaust gases according to the first preferred embodiment of the present invention.

FIG. 1 and FIG. 2 show a catalyst for purifying exhaust gases according to a first preferred embodiment of the present invention. This catalyst comprises a first catalyst 1, a second catalyst 2, and a third catalyst 3, being arranged axially. The respective catalysts have the same diameters and the axial length of the first catalyst, the second catalyst and the third catalyst has a ratio of 2:6:2. This catalyst is used by arranging the first catalyst 1 in the upper stream of the exhaust gases.

The first catalyst 1 comprises a first honeycomb support 10 formed of cordierite, a first catalyst carrier layer 11 formed of $SiO_2$ and coated on the surface of the first honeycomb support 10, and platinum (Pt) 12 loaded on the first carrier layer 11.

The second catalyst 2 comprises a second honeycomb support 20 formed of cordierite, a second catalyst carrier layer 21 formed of $Al_2O_3$ and coated on the surface of the second honeycomb support 20, and barium (Ba) 22 loaded on the second carrier layer 21.

The third catalyst 3 comprises a third honeycomb support 30 formed of cordierite, a third catalyst carrier layer 31 formed of $Al_2O_3$ and coated on the surface of the third honeycomb support 30, and platinum (Pt) 32 and Rh (rhodium) 33 loaded on the third catalyst layer 31.

Now, we will describe a method of producing this catalyst instead of describing its constitution in detail. It must be noted that hereinafter, parts mean parts by weight.

<The First Catalyst>

100 parts of porous silica powder, 70 parts of silica sol containing silica in an amount of 10% by weight, and 30 parts of water were stirred, thereby preparing slurry for coating.

Next, the first honeycomb support 10 formed of cordierite was immersed in water and blown to blow away excessive water. Then the first support 10 was immersed in this slurry and blown to blow away an excess of the slurry, dried at 80° C. for 20 minutes, and calcined at 600° C. for one hour, thereby forming the first carrier layer 11 on the support 10. The $SiO_2$ coating was in an amount of 120 grams with respect to 1 liter of the honeycomb support 10.

The honeycomb support thus coated with $SiO_2$ was immersed into an aqueous bivalent platinum ammine hydroxide solution. After pulled up and blown to blown away water droplets in excess, it was calcined at 250° C. for one hour. The loading amount of platinum (Pt) was 2.0 grams with respect to 1 liter of the honeycomb support 10.

<The Second Catalyst>

100 parts of alumina powder, 70 parts of alumina sol containing alumina in an amount of 10% by weight, 15 parts of a 40% by weight solution of aluminum nitrate in water, and 30 parts of water were mixed, thereby preparing slurry for coating.

This slurry was coated on the second honeycomb support 20 in the same way as in the first catalyst, thereby forming the second catalyst carrier layer 21. The $Al_2O_3$ coating was in an amount of 120 grams with respect to 1 liter of the honeycomb support 20.

The honeycomb support coated with $Al_2O_3$ was immersed in an aqueous barium acetate solution. After pulled up and blown to blow away water droplets in excess, it was dried at 110° C. for 12 hours and calcined at 600° C. for one hour. The loading amount of barium (Ba) 22 was 0.3 mol with respect to 1 liter of the honeycomb support 20.

<The Third Catalyst>

100 parts of alumina powder, 70 parts of alumina sol containing alumina in an amount of 10% by weight, 15 parts of a 40% by weight solution of aluminum nitrate in water, and 30 parts of water were mixed, thereby preparing slurry for coating.

This slurry was coated on the third honeycomb support 30 in the same way as in the first catalyst, thereby forming the third carrier layer 31. The $Al_2O_3$ coating was in an amount of 120 grams with respect to 1 liter of the honeycomb support 30.

The honeycomb support coated with $Al_2O_3$ was immersed in an aqueous platinum dinitrodiammine solution. After pulled up and blown to blow away water droplets in excess, it was calcined at 250° C. for one hour. Next, it was immersed in an aqueous rhodium nitrate solution. After pulled up and blown to blow away water droplets in excess, it was calcined at 250° C. for one hour. The loading amount of platinum (Ft) 32 was 2.0 grams with respect to 1 liter of the honeycomb support 30, and the loading amount of rhodium (Rh) 33 was 2.0 grams with respect to 1 liter of the honeycomb support 30.

The first catalyst 1, the second catalyst 2 and the third catalyst 3 thus produced were axially arranged in this order without providing space therebetween. Thus, the catalyst according to the first preferred embodiment of the present invention was produced.

The Second Preferred Embodiment

<The First Catalyst>

100 parts of porous silica powder, 70 parts of silica sol containing silica in an amount of 10% by weight, and 30 parts of water were stirred, thereby preparing slurry for coating.

Next, a honeycomb support formed of cordierite was immersed in water, and after blown to blow away excessive water, it was immersed in this slurry. After pulled up and blown to blow away the slurry in excess, it was dried at 80° C. for 20 minutes and calcined at 600° C. for one hour. The $SiO_2$ coating was in an amount of 120 grams with respect to 1 liter of the honeycomb support.

The honeycomb support thus coated with $SiO_2$ was immersed in an aqueous bivalent platinum ammine hydroxide solution. After pulled up and blown to blow away water droplets in excess, it was calcined at 250° C. for one hour. The loading amount of Pt was 2.0 grams with respect to 1 liter of the honeycomb support. The production method described so far was the same as the method of producing the first catalyst of the first preferred embodiment.

Next, the amount of water to be absorbed by the obtained honeycomb support was measured, and an aqueous nickel acetate solution was prepared to have concentration at which that amount of water absorption contained nickel by 3% by weight based on the honeycomb support. Then the honeycomb support was immersed in this solution. After pulled up and blown to blow away water droplets in excess, it was dried at 110° C. for 12 hours and calcined at 600° C. for one hour, thereby loading nickel and forming the first catalyst of the second preferred embodiment of the present invention.

<The Second Catalyst>

100 parts of alumina powder, 70 parts of alumina sol containing alumina in an amount of 10% by weight, 15 parts of a 40% by weight solution of aluminum nitrate in water, and 30 parts of water were commingled, thereby preparing slurry for coating.

This slurry was coated on the honeycomb support in the same way as in the first preferred embodiment. The $Al_2O_3$ coating was in an amount of 120 grams with respect to 1 liter of the honeycomb support.

This honeycomb support coated with $Al_2O_3$ was immersed in an aqueous copper acetate solution. After pulled up and blown to blow away water droplets in excess, it was dried at 110° C. for 12 hours and calcined at 600° C. for three hours, thereby loading copper (Cu). The loading amount of Cu was 8% by weight based on the alumina coating.

The obtained honeycomb support was further immersed in an aqueous barium acetate solution. After pulled up and blown to blow away water droplets in excess, it was dried at 110° C. for 12 hours and calcined at 600° C. for one hour. The loading amount of Ba was 0.3 mol with respect to 1 liter of the honeycomb support.
<The Third Catalyst>
This was produced in the same way as the third catalyst of the first preferred embodiment.

The Third Preferred Embodiment
<The First Catalyst>
This was produced in the same way as the first catalyst of the second preferred embodiment, except that slurry for coating was prepared by mixing 100 parts of zirconia powder, 70 parts of zirconia sol containing zirconia in an amount of 10% by weight, and 30 parts of water.
<The Second Catalyst>
This was produced in the same way as the second catalyst of the second preferred embodiment.
<The Third Catalyst>
This was produced in the same way as the third catalyst of the second preferred embodiment.

The Fourth Preferred Embodiment
<The First Catalyst>
This was produced in the same way as the first catalyst of the second preferred embodiment.
<The Second Catalyst>
This was produced in the same way as the second catalyst of the second preferred embodiment, except that slurry for coating was prepared by mixing 60 parts of alumina powder, 70 parts of alumina sol containing alumina in an amount of 10% by weight, 15 parts of a 40% by weight solution of aluminum nitrate in water, 30 parts of water, and 100 parts of $YBa_2Cu_3O_7$ powder. The $Al_2O_3$ coating was in an amount of 60 grams with respect to 1 liter of the honeycomb support.
<The Third Catalyst>
This was produced in the same way as the third catalyst of the second preferred embodiment.

The First Comparative Example
100 parts of alumina powder, 70 parts of alumina sol containing alumina in an amount of 10% by weight, 15 parts of a 40% by weight solution of aluminum nitrate in water, and 30 parts of water were mixed, thereby preparing slurry for coating.

A honeycomb support formed of cordierite was immersed in this slurry. After blown to blow away the slurry in excess and dried, it was calcined at 600° C. for one hour, thereby forming an alumina coating layer. The $Al_2O_3$ coating was in an amount of 120 grams with respect to 1 liter of the honeycomb support.

The honeycomb support having this alumina coating layer was immersed in an aqueous platinum dinitrodiammine solution. After blown to blow away water droplets in excess, it was dried at 250° C., thereby loading platinum (Pt). The loading amount of Pt was 2.0 grams with respect to 1 liter of the honeycomb support.

Next, this Pt-loaded honeycomb support was immersed in an aqueous barium acetate solution having a predetermined concentration. After blown to blow away water droplets in excess and dried, it was calcined at 600° C. for one hour, thereby preparing a comparative catalyst. The loading amount of Ba was 0.3 mol with respect to 1 liter of the support.

Examination and Evaluation

Each of the present catalysts and the comparative catalyst was disposed in an exhaust line of an actual vehicle equipped with a lean burn engine which had a displacement of 1.6 liters. The vehicle was driven in the urban area running modes, i.e., the 10-mode and the 15-mode, thereby examining the present catalysts and the comparative catalyst for the conversion of CO, HC, and $NO_x$.

After the aforementioned evaluation, each of the present catalysts and the comparative catalyst was subjected to a bench test on durability which utilized the same type of engine as above. That is to say, each of them was disposed in an exhaust line of the engine, and then the engine was run for 50 hours while adjusting the inlet exhaust gas temperature to the bed of catalyst at 650° C. and keeping the ratio of air to fuel at 18. After this bench test was over, each of them was again disposed in the exhaust line of the actual vehicle. The vehicle was driven in the same manner as described above, thereby examining the present catalysts and the comparative catalyst for the conversion of CO, HC, and $NO_x$ after the durability test. The fuel employed included sulfur in an amount of 70 ppm. The test results are shown in Table 1.

TABLE 1

| Catalyst | Layer | Coating Loaded Metal | Initial Conversion (%) $NO_x$ | HC | CO | Conversion After Durability Test (%) $NO_x$ | HC | CO |
|---|---|---|---|---|---|---|---|---|
| Example 1 | 1st | $SiO_2$ Pt | | | | | | |
| | 2nd | $Al_2O_3$ Ba | 40 | 93 | 100 | 36 | 89 | 92 |
| | 3rd | $Al_2O_3$ Pt, Rh | | | | | | |
| Example 2 | 1st | $SiO_2$ Pt, Ni | | | | | | |
| | 2nd | $Al_2O_3$ Ba, Cu | 65 | 95 | 100 | 57 | 89 | 94 |
| | 3rd | $Al_2O_3$ Pt, Rh | | | | | | |
| Example 3 | 1st | $ZrO_2$ Pt, Ni | | | | | | |
| | 2nd | $Al_2O_3$ Ba, Cu | 66 | 96 | 100 | 58 | 90 | 98 |
| | 3rd | $Al_2O_3$ Pt, Rh | | | | | | |
| Example 4 | 1st | $SiO_2$ Pt, Ni | | | | | | |
| | 2nd | $Al_2O_3$ $YBa_2Cu_3O_7$ | 62 | 92 | 99 | 55 | 86 | 93 |
| | 3rd | $Al_2O_3$ Pt, Rh | | | | | | |
| Comparative Example 1 | | $Al_2O_3$ Pt, Ba | 93 | 95 | 100 | 50 | 88 | 98 |

It is appreciated from Table 1 that although the initial $NO_x$ conversion performance of the present catalysts was not as good as that of the comparative catalyst, the ratios of the $NO_x$ conversion performance after the durability test to the initial $NO_x$ conversion performance (the $NO_{xc}$ conversion performance after the durability test/the initial $NO_x$ conversion performance) of the present catalysts were superior to that of the comparative catalyst by far. That is to say, the present catalysts had $NO_x$ conversion performance less deteriorated by the durability test, and were superior in durability to the comparative catalyst.

The Fifth Preferred Embodiment

Figure 3:
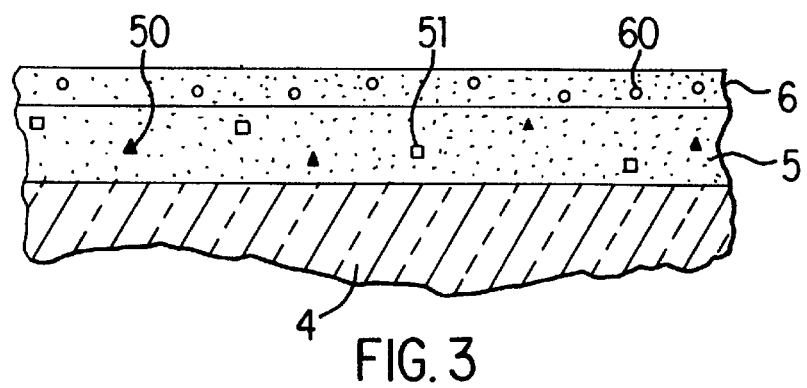
FIG. 3 is a cross-sectional view for explaining the constitution of a catalyst for purifying exhaust gases according to a fifth preferred embodiment of the present invention.

FIG. 3 shows an enlarged cross-sectional view of a part of catalyst for purifying exhaust gases according to a fifth preferred embodiment of the present invention. This catalyst comprises a honeycomb support 4, an inner catalyst carrier layer 5 formed on the surface of the honeycomb support 4, an outer catalyst carrier layer 6 formed on the surface of the inner carrier layer 5. Platinum (Pt) 50 and barium (Ba) 51 are loaded on the inner carrier layer 5, and $Fe_2O_3$ 60 is loaded on the outer carrier layer 6.

This catalyst for purifying exhaust gases was produced as follows. First, 150 g of water and 350 g of alumina sol containing alumina in an amount of 10% by weight were added to 500 g of alumina powder and stirred, thereby preparing slurry A. In the meanwhile, 175 g of alumina sol containing alumina in an amount of 10% by weight was added to 250g of alumina powder and 125g of $Fe_2O_3$ powder, and stirred, thereby preparing slurry B.

Next, a honeycomb support formed of cordierite was immersed in slurry A. After pulled up and blown to blow away the slurry in excess, it was dried at 80° C. for twenty minutes and calcined at 500° C. for one hour, thereby forming the inner carrier layer 5 by 100 g per liter. Then it was immersed in an aqueous platinum dinitrodiammine solution. After pulled up and blown to blow away water droplets in excess, it was dried at 80° C. and calcined at 500° C. Further it was immersed in an aqueous barium acetate solution, and pulled up and blown to blow away water droplets in excess. Then it was dried at 80° C. and calcined at 500° C. Thus, Pt and Ba were loaded on the inner carrier layer 5.

After that, the support 4 having the above inner carrier layer 5 thereon was immersed in slurry B. After pulled up and blown to blow away the slurry in excess, it was dried at 80° C. for twenty minutes and calcined at 500° C. for one hour, thereby forming the outer carrier layer 6 by 50 g per liter.

As shown in Table 2, the catalyst thus obtained had Pt in an amount of 1.0 g/liter and Ba in an amount of 0.2 mol/liter on the inner carrier layer 5, and Fe in an amount of 0.2 mol/liter on the outer carrier layer 6.

The Sixth Preferred Embodiment

This was produced in the same way as the catalyst of the fifth preferred embodiment, except that La was loaded instead of Ba, and $MnO_2$ was loaded instead of $Fe_2O_3$.

The Seventh Preferred Embodiment

This was produced in the same way as the catalyst of the fifth preferred embodiment, except that the outer carrier layer 6 was formed from slurry comprising 100 g of iron oxide powder and 100 g of alumina sol containing alumina in an amount of 10% by weight. In other words, the outer carrier layer 6 mainly comprised iron oxide and included alumina only by about 10% by weight.

The Eighth and Ninth Preferred Embodiments

These were produced in the same way as the catalyst of the seventh preferred embodiment, except that the kinds and amounts of loading metals are those shown in Table 2.

The Tenth Preferred Embodiment 250 g of alumina powder and 125 g of $Fe_2O_3$ powder were added to an aqueous platinum dinitrodiammine solution and stirred, thereby loading Pt on the powder. After filtered, it was dried and calcined, thereby obtaining Pt-loaded powder. 150 g of water and 350 g of alumina sol containing alumina in an amount of 10% by weight were added to 375 g of this Pt-loaded powder, and stirred, thereby obtaining slurry B. The outer carrier layer 6 was made from slurry B by 50 g/liter. A catalyst of the tenth preferred embodiment was produced in the same way as that of the fifth preferred embodiment, except the aforementioned facts. That is to say, in this catalyst, Pt in addition to Fe was loaded on the outer carrier layer 6 by 0.3 g/liter.

The Eleventh to Eighteenth Preferred Embodiments

These were produced in the same way as the catalyst of the tenth preferred embodiment, except that the kinds and amounts of loading metals were those shown in Table 2.

The Second to Fourth Comparative Examples

These were produced in the same way as the first comparative catalyst, except that the kinds and amounts of loading metals were those shown in Table 2.

Examination and Evaluation

Each of the present catalysts and the comparative catalysts was disposed in an exhaust line of an actual vehicle equipped with a lean burn engine which had a displacement of 1.6 liters. The vehicle was driven in the urban area running modes, i.e., the 10-mode and the 15-mode, thereby examining the present catalysts and the comparative catalysts for the conversion of CO, HC and $NO_x$.

After the aforementioned evaluation, each of the present catalysts and the comparative catalysts was subjected to a bench test on durability which utilized the same type of engine as above. That is to say, each of them was disposed in an exhaust line of the engine, and then the engine was run for 50 hours while adjusting the inlet exhaust gas temperature to the bed of catalyst at 650° C. and keeping the ratio of air to fuel at 18. After this bench test was over, each of them was again disposed in the exhaust line of the actual vehicle. The vehicle was driven in the same manner as described above, thereby examining the present catalysts and the comparative catalysts for the conversion of CO, HC, and $NO_x$ after the durability test. The fuel employed included sulfur in an amount of 70 ppm. The test results are shown in Table 2.

TABLE 2

| | | Inner Carrier Layer | | | Load Amount of Element (g. mol/L) | | | | Outer Carrier Layer | | | Load Amount of Element (g. mol/L) | | | | Initial conversion (%) | | | Conversion after Durability Test(%) | | |
|---|---|---|---|---|---|---|---|---|---|---|---|---|---|---|---|---|---|---|---|---|---|
| | | Pt | Pd | Ba | La | Li | K | Na | Pt | Pb | Mn | Fe | Co | Ni | Cu | NOx | HC | CO | NOx | HC | CO |
| Examples | 5 | 1.0 | — | 0.2 | — | — | — | — | — | — | — | 0.2 | — | — | — | 92 | 96 | 98 | 70 | 96 | 99 |
| | 6 | 1.0 | — | — | 0.2 | — | — | — | — | — | 0.2 | — | — | — | — | 87 | 98 | 100 | 69 | 95 | 99 |
| | 7 | 1.0 | — | 0.2 | — | — | — | — | — | — | — | 0.2 | — | — | — | 93 | 96 | 100 | 60 | 94 | 97 |
| | 8 | 1.0 | — | — | 0.3 | — | — | — | — | — | — | — | 0.3 | — | — | 90 | 99 | 100 | 58 | 97 | 98 |
| | 9 | 1.0 | — | — | — | 0.2 | — | — | — | — | — | — | — | 0.3 | — | 88 | 96 | 100 | 57 | 94 | 98 |
| | 10 | 1.0 | — | 0.2 | — | — | — | — | 0.3 | — | — | 0.2 | — | — | — | 88 | 96 | 100 | 68 | 96 | 99 |
| | 11 | 1.0 | — | — | 0.2 | — | — | — | 0.3 | — | 0.2 | — | — | — | — | 84 | 98 | 100 | 65 | 95 | 98 |
| | 12 | 1.0 | — | — | — | 0.3 | — | — | 0.3 | — | — | — | 0.3 | — | — | 81 | 97 | 100 | 68 | 96 | 98 |
| | 13 | 1.0 | — | — | — | — | 0.2 | — | 0.5 | — | — | — | — | 0.3 | — | 86 | 96 | 98 | 64 | 96 | 98 |
| | 14 | 1.0 | — | — | — | — | — | 0.2 | 0.5 | — | — | — | — | — | 0.3 | 92 | 96 | 99 | 67 | 94 | 99 |
| | 15 | — | 2.0 | 0.3 | — | 0.1 | — | — | — | 0.5 | — | 0.2 | — | — | — | 89 | 97 | 98 | 71 | 94 | 99 |
| | 16 | — | 2.0 | — | 0.3 | — | 0.1 | — | — | 0.5 | — | — | 0.3 | — | — | 87 | 96 | 99 | 65 | 94 | 99 |
| | 17 | — | 2.0 | — | — | 0.1 | — | 0.3 | — | 1.0 | — | — | — | 0.3 | — | 90 | 97 | 99 | 70 | 95 | 99 |
| | 18 | — | 2.0 | 0.2 | — | — | — | 0.2 | — | 1.0 | — | — | — | — | 0.3 | 91 | 95 | 98 | 71 | 93 | 99 |
| Comparative Examples | 2 | 1.0 | — | 0.2 | — | — | — | — | — | — | — | — | — | — | — | 91 | 96 | 100 | 48 | 92 | 96 |
| | 3 | — | 2.0 | 0.3 | — | 0.1 | — | — | — | — | — | — | — | — | — | 93 | 96 | 100 | 45 | 93 | 98 |
| | 4 | 1.0 | — | — | 0.2 | — | — | — | — | — | — | — | — | — | — | 88 | 98 | 100 | 46 | 96 | 99 |

It is appreciated from Table 2 that although the initial $NO_x$ conversion performance of the present catalysts was not as good as that of the comparative examples, the ratios of the $NO_x$ conversion performance after the durability test to the initial $NO_x$ conversion performance (the $NO_x$ conversion performance after the durability test/the initial $NO_x$ conversion performance) of the present catalysts were superior to those of the comparative catalysts by far. That is to say, the present catalysts had $NO_x$ conversion performance less deteriorated by the durability test, and were superior in durability to the comparative catalysts.

Having now fully described the present invention, it will be apparent to one of ordinary skill in the art that many changes and modifications can be made thereto without departing from the spirit or scope of the present invention as set forth herein including the appended claims.

What is claimed is:

1. A method for purifying exhaust gas comprising bringing exhaust gas into contact with a catalyst in oxygen-rich atmospheres in which oxygen concentrations of the exhaust gas are at or above the stoichiometric point required for oxidizing components of the exhaust gas to be oxidized, said catalyst comprising:

a porous support, a lower layer loaded on said porous support, said lower layer comprising a noble metal catalyst ingredient and at least one $NO_x$ absorber selected from the group consisting of alkaline metals, alkaline-earth metals and rare earth metals, and an upper layer formed on said lower layer, said upper layer comprising oxides of at least one metal selected from the group consisting of iron (Fe), cobalt (Co), nickel (Ni), copper (Cu) and manganese (Mn), wherein under said oxygen-rich atmospheres, nitrogen oxides and sulfur oxides in said exhaust gas react with said oxides of at least one metal to form nitrogen oxide salts and sulfur oxide salts, said nitrogen oxide salts decompose to restore said nitrogen oxides and said oxides of at least one metal, said restored nitrogen oxides are absorbed by said $NO_x$ absorber, said restored oxides of at least one metal react with sulfur oxides to form sulfur oxide salts, and said sulfur oxide salts decompose at a temperature higher than said nitrogen oxide salts to restore said oxides of at least one metal.

2. A method according to claim 1, wherein $SO_2$ in said exhaust gas reacts with the upper layer to form sulfate, decreasing the amount of $SO_2$ in the lower layer and thereby decreasing sulfur poisoning.

3. A method according to claim 1, wherein said upper layer further comprises a noble metal catalyst ingredient.

4. The method of claim 1, wherein said exhaust gas is automotive exhaust gas.

* * * * *